(12) United States Patent
Ho et al.

(10) Patent No.: US 7,205,930 B2
(45) Date of Patent: Apr. 17, 2007

(54) INSTANTANEOUS 3—D TARGET LOCATION RESOLUTION UTILIZING ONLY BISTATIC RANGE MEASUREMENT IN A MULTISTATIC SYSTEM

(75) Inventors: Shu K. Ho, Granada Hills, CA (US); Gordon R. Chalmers, Stockton, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/144,133

(22) Filed: Jun. 3, 2005

(65) Prior Publication Data

US 2006/0273950 A1    Dec. 7, 2006

(51) Int. Cl.
*G01S 13/06* (2006.01)
*G01S 13/08* (2006.01)
*G01S 13/46* (2006.01)
*G01S 13/00* (2006.01)

(52) U.S. Cl. .................. 342/126; 342/59; 342/118; 342/120; 342/175; 342/195; 342/450; 342/451; 342/463; 342/464; 342/465

(58) Field of Classification Search .................. 342/59, 342/82, 89, 118–145, 175, 195, 450–465, 342/91, 165, 173–174
See application file for complete search history.

(56) References Cited

U.S. PATENT DOCUMENTS

| | | | | |
|---|---|---|---|---|
| 3,184,739 A | * | 5/1965 | Franklin et al. | 342/126 |
| 3,242,487 A | * | 3/1966 | Hammack | 324/130 |
| 3,706,096 A | * | 12/1972 | Hammack | 342/125 |
| 3,795,911 A | * | 3/1974 | Hammack | 342/463 |
| 3,953,856 A | * | 4/1976 | Hammack | 342/458 |
| 3,996,590 A | * | 12/1976 | Hammack | 342/465 |
| 4,370,656 A | * | 1/1983 | Frazier et al. | 342/458 |
| 6,850,186 B2 | * | 2/2005 | Hellsten | 342/59 |

* cited by examiner

*Primary Examiner*—Bernarr E. Gregory
(74) *Attorney, Agent, or Firm*—Leonard A. Alkov

(57) ABSTRACT

A multistatic radar has a radar transmitter for illuminating a target with a radar signal. The target reflects the radar signal to three separate radar receivers, each performing a bistatic range measurement to the target. The three bistatic range measurements are combined in a quadratic equation having two solutions (roots). One solution (root) corresponds to a correct three dimensional target position with respect to the radar transmitter while the other is an incorrect three dimensional target position with respect to the radar transmitter. The incorrect three dimensional target position is identified and eliminated by comparing the three dimensional target position to the transmitter location, and the receiver locations. The incorrect three dimensional target position is also identified by the target altitude exceeding a threshold, typically set above 80,000 feet AGL.

6 Claims, 2 Drawing Sheets

INSTANTANEOUS 3—D TARGET LOCATION RESOLUTION UTILIZING ONLY BISTATIC RANGE MEASUREMENT IN A MULTISTATIC SYSTEM

This invention was made with United States Government support under Contract No. N00014-02-C-0457 awarded by the Department of the Navy. The United States Government has certain rights in this invention.

BACKGROUND OF THE INVENTION

1. Field of the Invention

This invention is in the field of multistatic radars, specifically using three bistatic one dimensional measurements to calculate a three dimensional target location.

2. Description of the Related Art

In a bistatic radar there is a separation between the transmit portion (illuminator) and the receiver. The separation requires synchronization of the receive and transmit functions. That is, accurate phase information, transmit time, transmitter geo-location are conveyed from the transmitter to the receiver to facilitate deriving a phase coherent image at the receiver. This information is typically conveyed using a datalink between transmitter and receiver.

In general, in the prior art, three dimensional target location was performed with bistatic radars by positioning a plurality of receivers for performing range measurements. The range measurements relied on various combinations of bistatic range, range difference, Doppler and angles. The data was accumulated over a plurality of pulses. This plurality of pulses allowed target location estimates to be integrated over time.

The complexity of three dimensional target location using a combination of bistatic radars compounds when a plurality of targets are considered concurrently. For example, range ambiguities for the plurality of targets may render the measurements, even when integrated over multiple pulses, inaccurate. Thus, it is desired to perform accurate three dimensional target measurements on a plurality of target in as short a period of time as practicable.

SUMMARY OF THE INVENTION

Above limitations are avoided by a multistatic radar of the present invention comprising a radar transmitter at a transmitter location having a transmitter altitude. The radar transmitter illuminates a target at a target location having a target altitude with a radar signal. The target reflects the radar signal to a first radar receiver at a first receiver location at a first altitude, a second radar receiver at a second receiver location at a second altitude, and a third radar receiver at a third receiver location at a third altitude. The first radar receiver performs a first bistatic range measurement to the target. The second radar receiver performs a second bistatic range measurement to the target. The third radar receiver performs a third bistatic range measurement to the target.

The first bistatic range measurement is combined with the second bistatic range measurement and the third bistatic range measurement to obtain a correct three dimensional target position with respect to the radar transmitter as well as an incorrect three dimensional target position with respect to the radar transmitter. The solution for the three dimensional target position is arrived at by combining the first bistatic range measurement with the second bistatic range measurement and the third bistatic range measurement in a quadratic equation yielding two solutions (roots) descriptive of the correct three dimensional target position and the incorrect three dimensional target position. In choosing between the two solutions (roots) of the quadratic equation, the incorrect three dimensional target position is identified and eliminated by comparing the (incorrect) three dimensional target position to the transmitter location, the first receiver location, the second receiver location, and the third receiver location. Another way to distinguish between the two roots is by comparing the solved for target altitude with the transmitter altitude. The incorrect three dimensional target position is identified by the target altitude exceeding a threshold, typically set above 80,000 feet AGL.

DETAILED DESCRIPTION OF THE INVENTION

The present invention describes an apparatus and method for computing three dimensional coordinates of a target by using three, one dimensional bistatic range measurements to the same target.

Figure 1:
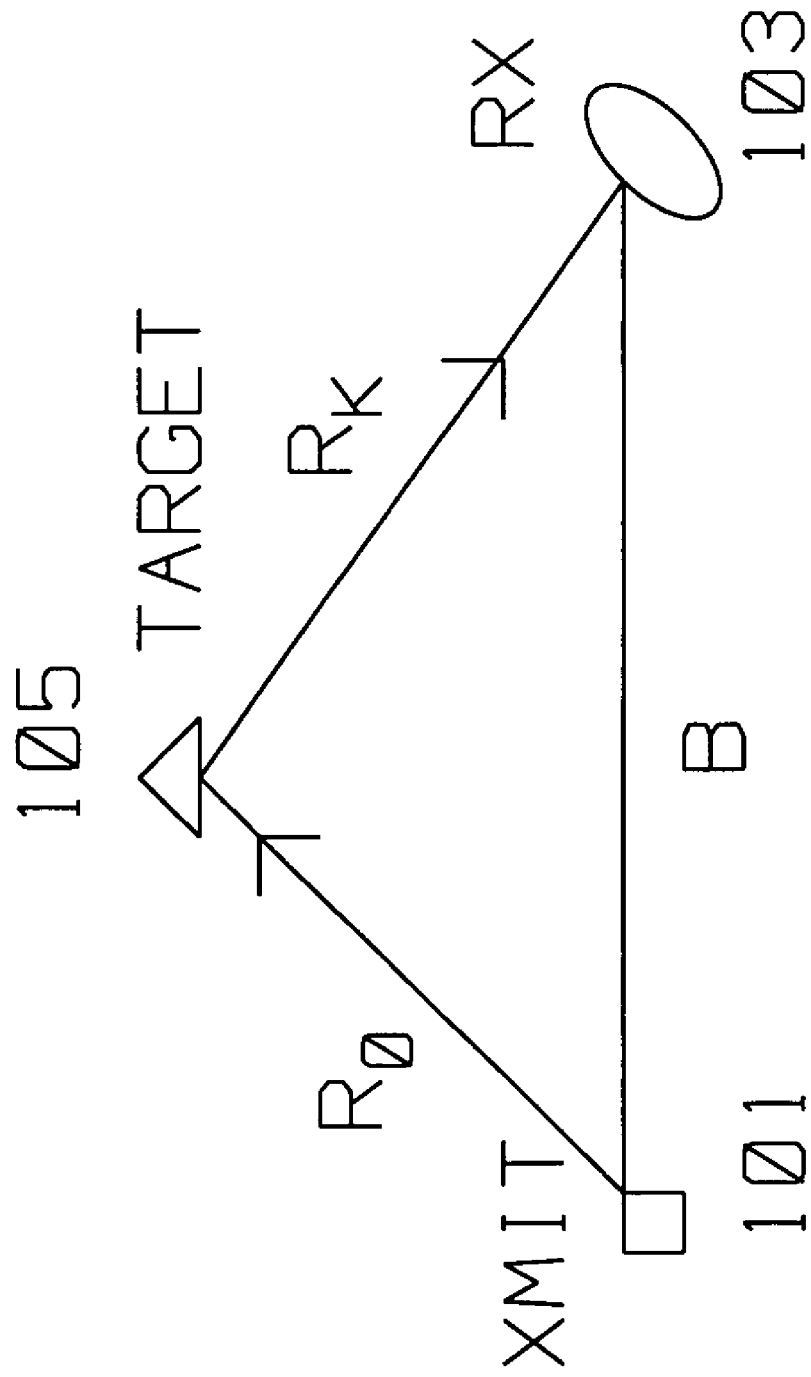
FIG. 1 is a bistatic radar operational geometry of the prior art.

FIG. 1 shows the operation of a bistatic radar of the prior art. Transmitter (or illuminator) 101 transmits a radar signal, typically a series of radar pulses, to illuminate target 105. Target 105 is at a distance $R_0$ away from transmitter 101.

Target 105 reflects the radar energy contained in the radar pulses from transmitter 101 towards receiver 103. Receiver 103 is a distance $R_K$ away from target 105.

Receiver 103 is also a distance B away from transmitter 101.

Distances $R_0$, $R_K$ and B are measured from a central reference point (CRP), typically the point where the transmit antenna launches the radar pulse wavefront.

The bistatic radar system of FIG. 1 comprises a radar transmitter (101) at a first location on a moving platform having a motion (acceleration, velocity). Radar transmitter (101) illuminates target (105) along an indirect path with a radar signal, while concurrently illuminating a radar receiver (103) along direct path B. The radar signal is radiated at a start time from the CRP. A signal containing the first location (illuminator geo-locating codes), the start time (the $t_0$, or initial transmit time of radar signal,(pulse generation)), the central reference point and motion of said platform is sent between transmitter 101 and receiver 103 using a datalink along path B or encoded as part of the radar signal itself. In some implementations, bit synchronization codes are included for better clock control and synchronization between transmitter 101 and receiver 103. A SAR image of target 105 is thus acquired at receiver 103.

However, the SAR image of the prior art, including range to target, typically relies on multiple measurements including various combinations of bistatic range, range difference, frequency Doppler shifts and angles. This combination of parameters required for the resolution of multiple target locations poses a difficult problem of false target rejection in a multiple target environment.

Figure 2:
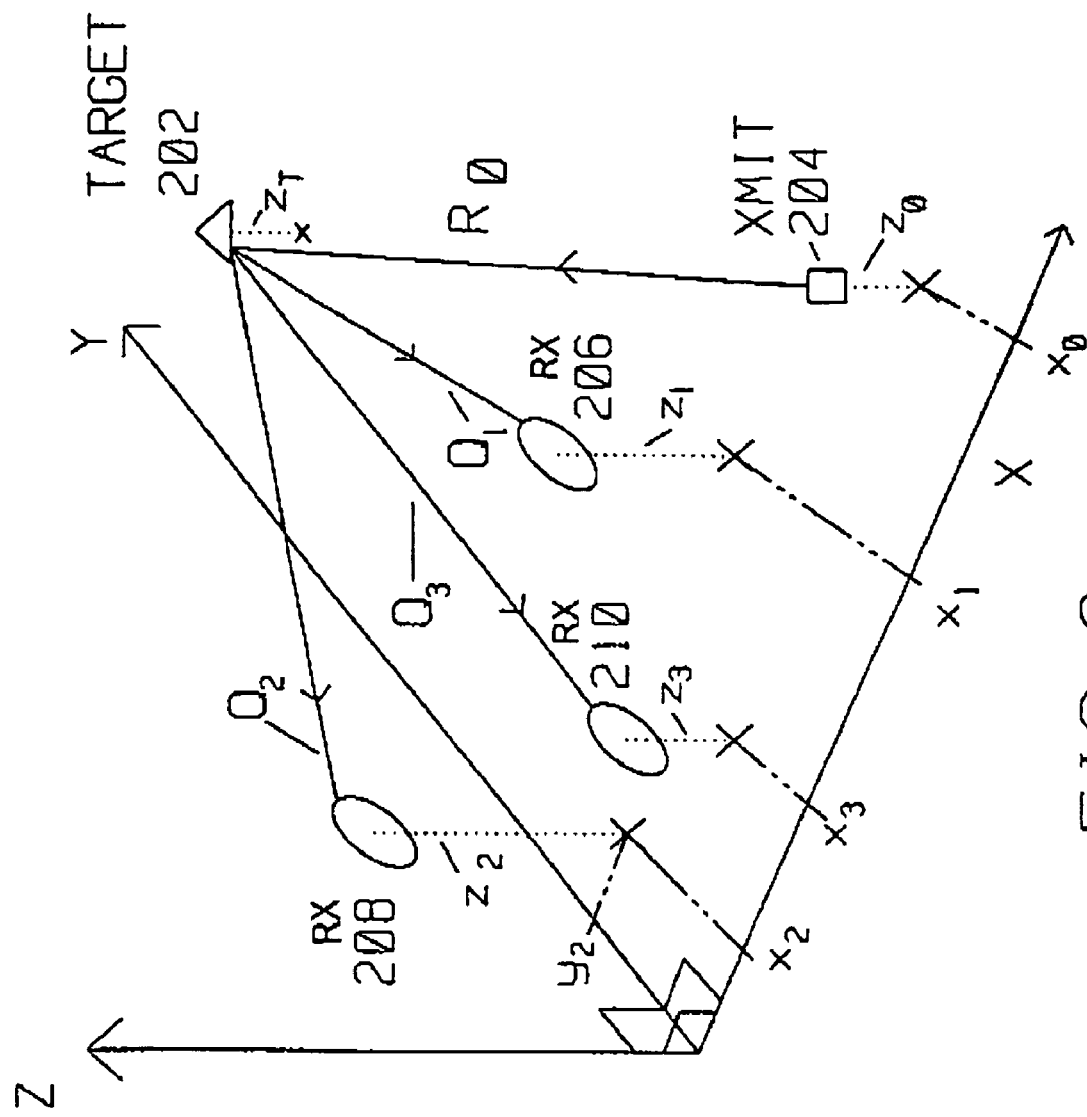
FIG. 2 is multistatic radar of the present invention using three bistatic receivers.

The multistatic radar of the present invention shown in FIG. 2 avoids the problems of the prior art. Transmitter 204 and receivers 206, 208 and 210 perform bistatic one dimensional range measurements $Q_1$, $Q_2$, $Q_3$ on target 202 to compute a 3 dimensional position position of target 202.

Target 202 is at a target location $x_T, y_T$, at a target altitude $z_T$. Transmitter 204 is at a transmitter location $x_0, y_0$, at a transmitter altitude $z_0$. Receiver 206 measures a range $Q_1$ to target 202, is at a first location $x_1, y_1$ in the X,Y plane, at a first altitude $z_1$ above the X,Y plane. Receiver 208 measures a range $Q_2$ to target 202, is at a second location $x_2, y_2$ in the X,Y plane, at a second altitude $z_2$ above the X,Y plane. The coordinates $x_2, y_2$ for receiver 208 are projected on the X and Y axes, shown in FIG. 2, as an example applicable for all other coordinates. Receiver 210 measures a range $Q_3$ to target 202, is at third location $x_3, y_3$ in the X,Y plane, at a third altitude $z_3$ above the X,Y plane.

A multistatic radar system of the present invention is characterized by the set of coupled non-linear equations:

$$R_0^2 = (x_0 - x_T)^2 + (y_0 - y_T)^2 + (z_0 - z_T)^2 \quad (1)$$

$$(Q_1 - R_0)^2 = (x_1 - x_T)^2 + (y_1 - y_T)^2 + (z_1 - z_T)^2 \quad (2)$$

$$(Q_2 - R_0)^2 = (x_2 - x_T)^2 + (y_2 - y_T)^2 + (z_2 - z_T)^2 \quad (3)$$

$$(Q_3 - R_0)^2 = (x_3 - x_T)^2 + (y_3 - y_T)^2 + (z_3 - z_T)^2 \quad (4)$$

where x,y,z are the coordinates of the Cartesian reference frame;
the subscripts 0,i for i=1,2,3 and T denote the illuminator, the 3 receivers 206, 208 and 210 and the target 202 respectively;
$Q_1$, $Q_2$ and $Q_3$ are the bistatic range measurements;
$R_0$ is the unknown range from the illuminator to the target.

The system is linearized in $R_0, x_T, y_T$, and $z_T$ by taking the difference of the above equations 1 through 4, for example Eq1–Eq2, Eq2–Eq3, Eq3–Eq4 as follows:

$$-Q_1^2 + 2Q_1 R_0 - (x_0^2 + y_0^2 + z_0^2) + (x_1^2 + y_1^2 + z_1^2) = 2(x_1 - x_0) x_T + 2(y_1 - y_0) y_T + 2(z_1 - z_0) z_T \quad (5)$$

$$Q_1^2 - Q_2^2 + 2(Q_2 - Q_1) R_0 - (x_1^2 + y_1^2 + z_1^2) + (x_2^2 + y_2^2 + z_2^2) = 2(x_2 - x_1) x_T + 2(y_2 - y_1) y_T + 2(z_2 - z_1) z_T \quad (6)$$

$$Q_2^2 - Q_3^2 + 2(Q_3 - Q_2) R_0 - (x_2^2 + y_2^2 + z_2^2) + (x_3^2 + y_3^2 + z_3^2) = 2(x_3 - x_2) x_T + 2(y_3 - y_2) y_T + 2(z_3 - z_2) z_T \quad (7)$$

Above equations 5,6,7 are formulated in matrix form to yield:

$$\vec{V} = M \vec{X} \quad (8)$$

$$\vec{V}_A + R_0 \vec{V}_B = M \vec{X} \quad (9)$$

where the 3×1 vector $\vec{V}$ is decomposed into two 3×1 components $\vec{V}_A$ and $\vec{V}_B$, with $\vec{V}_A$ independent of $R_0$;
$(R_0 \vec{V}_B)$ carries the explicit linear dependency in $R_0$;
M is a 3×3 matrix;
$\vec{X}$ is the 3×1 target position vector comprised of $x_T, y_T, z_T$
The specific terms for M are given by equations 5,6,7 as:

$$M(1,1) = 2(x_2 - x_1) \quad 10a$$

$$M(1,2) = 2(y_2 - y_1) \quad 10b$$

$$M(1,3) = 2(z_2 - z_1) \quad 10c$$

$$M(2,1) = 2(x_1 - x_0) \quad 10d$$

$$M(2,2) = 2(y_1 - y_0) \quad 10e$$

$$M(2,3) = 2(z_1 - z_0) \quad 10f$$

$$M(3,1) = 2(x_3 - x_2) \quad 10g$$

$$M(3,2) = 2(y_3 - y_2) \quad 10h$$

$$M(3,3) = 2(z_3 - z_2) \quad 10i$$

Similarly, the expressions for $\vec{V}_A$ and $\vec{V}_B$ are obtained from equations 5,6,7:

$$\vec{V}_A(1) = -Q_1^2 - (x_0^2 + y_0^2 + z_0^2) + (x_1^2 + y_1^2 + z_1^2) \quad 11a$$

$$\vec{V}_A(2) = Q_1^2 - Q_2^2 - (x_1^2 + y_1^2 + z_1^2) + (x_2^2 + y_2^2 + z_2^2) \quad 11b$$

$$\vec{V}_A(3) = Q_2^2 - Q_3^2 - (x_2^2 + y_2^2 + z_2^2) + (x_3^2 + y_3^2 + z_3^2) \quad 11c$$

$$\vec{V}_B(1) = 2 Q_1 R_0 \quad 12a$$

$$\vec{V}_B(2) = 2(Q_2 - Q_1) R_0 \quad 12b$$

$$\vec{V}_B(3) = 2(Q_3 - Q_2) R_0 \quad 12c$$

Solve for $\vec{X}$ by inverting the matrix M in equation 9, treating the unknown parameter $R_0$ as an independent variable $$\vec{X} = \vec{U}_A + R_0 \vec{U}_B \quad 13$$

where $$\vec{U}_A(1) = M^{-1}(1,1) \vec{V}_A(1) + M^{-1}(1,2) \vec{V}_A(2) + M^{-1}(1,3) \vec{V}_A(3) \quad 14a$$

$$\vec{U}_A(2) = M^{-1}(2,1) \vec{V}_A(1) + M^{-1}(2,2) \vec{V}_A(2) + M^{-1}(2,3) \vec{V}_A(3) \quad 14b$$

$$\vec{U}_A(3) = M^{-1}(3,1) \vec{V}_A(1) + M^{-1}(3,2) \vec{V}_A(2) + M^{-1}(3,3) \vec{V}_A(3) \quad 14c$$

$$\vec{U}_B(1) = M^{-1}(1,1) \vec{V}_B(1) + M^{-1}(1,2) \vec{V}_B(2) + M^{-1}(1,3) \vec{V}_B(3) \quad 15a$$

$$\vec{U}_B(2) = M^{-1}(2,1) \vec{V}_B(1) + M^{-1}(2,2) \vec{V}_B(2) + M^{-1}(2,3) \vec{V}_B(3) \quad 15b$$

$$\vec{U}_B(3) = M^{-1}(3,1) \vec{V}_B(1) + M^{-1}(3,2) \vec{V}_B(2) + M^{-1}(3,3) \vec{V}_B(3) \quad 15c$$

Complete the solution by substituting the expression for $\vec{X}$ from equation 13 into equation 1 to solve for the remaining unknown parameter $R_0$. This yields a quadratic equation in $R_0$:

$$C_A R_0^2 + C_B R_0 + C_C = 0 \quad 16$$

with $$C_A = \vec{U}_B(1)^2 + \vec{U}_B(2)^2 + \vec{U}_B(3)^2 - 1 \quad 17$$

$$C_B = 2 \vec{U}_B(1)(\vec{U}_A(1) - x_0) + 2 \vec{U}_B(2)(U_A(2) - x_0) + 2 \vec{U}_B(3)(\vec{U}_A(3) - x_0) \quad 18$$

$$C_C = (\vec{U}_A(1) - x_0)^2 + (\vec{U}_A(2) - x_0)^2 + (\vec{U}_A(3) - x_0)^2 \quad 19$$

The two solutions (roots) of $R_0$ are given by $$R_{0_1} = \frac{-C_B + \sqrt{(C_B^2 - 4C_A C_C)}}{2C_A} \quad 20$$

$$R_{0_2} = \frac{-C_B - \sqrt{(C_B^2 - 4C_A C_C)}}{2C_A} \quad 21$$

The two solutions (roots) from equations 20 and 21 represent a correct three dimensional target position with respect to the radar transmitter 204 and an incorrect three dimensional target position with respect to the radar transmitter 204. It is not known which of the two roots is the correct three dimensional target position with respect to the radar transmitter 204. Thus, equation 13 with $R_0$ defined by equation 20 and equation 21, resolves the target 3 D location from 3 bistatic range measurements resulting in a true location and a location ambiguity due to the non-physical root of $R_0$. That is, the incorrect three dimensional target position will suggest a target position that is physically impossible to achieve because of known target, transmitter and receiver locations.

Thus, in accordance with above analysis, as shown in FIG. 2, a multistatic radar system of the present invention comprises the following components and operation.

A radar transmitter 204 at a transmitter location $x_0, y_0$ having a transmitter altitude $z_0$, illuminates a target 202 at a target location $x_T, y_T$ having a target altitude $z_T$ above the x,y plane with a radar signal. Target 202 reflects the radar signal emitted from transmitter 204 to a first radar receiver 206 at a first receiver location $x_1, y_1$ at a first altitude $z_1$, a second radar receiver 208 at a second receiver location $x_2, y_2$ at a second altitude $z_2$ and a third radar receiver 210 at a third receiver location $x_3, y_3$ at a third altitude, $z_3$.

First radar receiver 206 performs a first bistatic range measurement to target 202. Concurrently, second radar receiver 208 performs a second bistatic range measurement to target 202. Also concurrently with radar receivers 206 and 208, third radar receiver 210 performs a third bistatic range measurement to target 202. The range measurements are concurrent because they are taken using the same transmit pulse from transmitter 204.

Transmitter 204, and receivers 206, 208 and 210 are linked using a datalink, not shown. Thus the bistatic measurements from receivers 206, 208 and 210 are transmitted to transmitter 204 for further processing, as detailed below.

The first bistatic range measurement $Q_1$ is combined with the second bistatic range measurement $Q_2$ and the third bistatic range measurement to obtain a correct three dimensional target position with respect to transmitter 204 to target 202 and an incorrect three dimensional target position from transmitter 204 to target 202, as detailed in equations 20 and 21.

The incorrect three dimensional target position from transmitter 204 to target 202 is identified by comparing it to transmitter 204 location, first receiver 206 location, second receiver 208 location, and third receiver location 210. That is, the incorrect three dimensional target position will result in a non-physical solution.

Another alternative to distinguishing the incorrect three dimensional target position from transmitter 204 to target 202 is identified by comparing target altitude indicated by the incorrect three dimensional target position with the known transmitter altitude $z_0$. The incorrect three dimensional target position will indicate an altitude above a threshold, such as 80,000 ft for target 202.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this invention and definition of variables used herein.

Although presented in exemplary fashion employing specific embodiments, the disclosed structures are not intended to be so limited. For example, although it is disclosed that three bistatic receivers make a concurrent measurement from a single pulse from transmitter 204, the measurement can be performed sequentially with a single bistatic receiver at three separate locations. The measurements obtained at three different locations by a single bistatic receiver are motion compensated to appear as if taken at a single instant in time.

Those skilled in the art will also appreciate that numerous changes and modifications could be made to the embodiment described herein without departing in any way from the invention.

The invention claimed is:

1. A multistatic radar comprising:
   a radar transmitter at a transmitter location having a transmitter altitude, said radar transmitter illuminating a target at a target location having a target altitude with a radar signal, said target reflecting said radar signal to a first radar receiver at a first receiver location at a first altitude, a second radar receiver at a second receiver location at a second altitude, and a third radar receiver at a third receiver location at a third altitude,
   said first radar receiver performing a first bistatic range measurement to said target, said second radar receiver performing a second bistatic range measurement to said target, said third radar receiver performing a third bistatic range measurement to said target,
   means for combining said first bistatic range measurement with said second bistatic range measurement and said third bistatic range measurement to obtain a correct three dimensional target position with respect to said radar transmitter and an incorrect three dimensional target position with respect to said radar transmitter,
   means for identifying said incorrect three dimensional target position by comparing said incorrect three dimensional target position to said transmitter location, said first receiver location, said second receiver location, and said third receiver location,
   wherein said first bistatic range measurement is combined with said second bistatic range measurement and said third bistatic range measurement in a quadratic equation solved for said correct three dimensional target position and said incorrect three dimensional target position, and
   wherein said incorrect three dimensional target position is identified by comparing said target altitude with said transmitter altitude.

2. A multistatic radar as described in claim 1 said incorrect three dimensional target position is identified by said target altitude exceeding a threshold.

3. A multistatic radar as described in claim 2 wherein said first bistatic range measurement is taken concurrently in time with said second bistatic range measurement and said third bistatic range measurement.

4. A method for operating a multistatic radar comprising the steps of:

illuminating a target at a target location having a target altitude with a radar signal from a radar transmitter at a transmitter location having a transmitter altitude, said target reflecting said radar signal to a first radar receiver at a first receiver location at a first altitude, a second radar receiver at a second receiver location at a second altitude, and a third radar receiver at a third receiver location at a third altitude;

performing a first bistatic range measurement to said target using said first radar receiver;

performing a second bistatic range measurement to said target using said second radar receiver;

performing a third bistatic range measurement to said target using said third radar receiver;

combining said first bistatic range measurement with said second bistatic range measurement and said third bistatic range measurement to obtain a correct three dimensional target position with respect to said radar transmitter and an incorrect three dimensional target position with respect to said radar transmitter;

identifying said incorrect three dimensional target position by comparing said incorrect three dimensional target position to said transmitter location, and first receiver location, said second receiver location, and said third receiver location, wherein said first bistatic range measurement is combined with said second bistatic range measurement and said third bistatic range measurement to yield a quadratic equation solved for said correct three dimensional target position and said incorrect three dimensional target position, and wherein said incorrect three dimensional target position is identified by comparing said target altitude with said transmitter altitude.

5. A method as described in claim 4 wherein said incorrect three dimensional target position is identified by said target altitude exceeding a threshold.

6. A method as described in claim 5 wherein said first bistatic range measurement is taken concurrently in time with said second bistatic range measurement and said third bistatic range measurement.

* * * * *